United States Patent [19]

Mendoza et al.

[11] Patent Number: 4,729,400
[45] Date of Patent: Mar. 8, 1988

[54] LIQUID CONTROL ASSEMBLY

[75] Inventors: Benjamin D. Mendoza, Fontana; William L. Wright, Ontario, both of Calif.

[73] Assignee: Robert Manufacturing Company, Cucamonga, Calif.

[21] Appl. No.: 840,381

[22] Filed: Mar. 17, 1986

[51] Int. Cl.⁴ .................. F16K 43/00; F16K 31/20
[52] U.S. Cl. .................... 137/315; 137/390; 137/442; 137/444; 137/544; 210/463; 251/327
[58] Field of Search .............. 137/315, 390, 434, 442, 137/443, 444, 544, 549, 238; 210/463; 251/327, 329

[56] References Cited

U.S. PATENT DOCUMENTS

| | | | |
|---|---|---|---|
| 1,204,106 | 11/1916 | Wing | 137/549 |
| 1,563,339 | 12/1925 | Chandler | 137/434 |
| 1,576,600 | 3/1926 | Haas | 137/434 |
| 1,709,576 | 4/1929 | Hvoslef | 137/434 |
| 1,903,591 | 4/1933 | Haimbaugh et al. | 137/434 |
| 2,376,623 | 5/1945 | Romberg | 137/434 |
| 2,550,441 | 4/1951 | Barling | 137/443 |
| 2,766,770 | 10/1956 | Dickinson | 137/437 |
| 2,782,797 | 2/1957 | Hintermayr | 137/434 |
| 2,790,457 | 4/1957 | Millerwise | 137/434 |
| 2,813,538 | 11/1957 | DiGenova | 137/443 |
| 3,286,724 | 11/1986 | Sawyer | 137/442 |
| 3,405,687 | 11/1968 | Ruter | 119/78 |
| 3,471,123 | 10/1969 | Carlson et al. | 137/434 |
| 3,572,553 | 3/1971 | Ogden | 137/448 |
| 4,456,026 | 6/1984 | Kantor | 251/329 |

FOREIGN PATENT DOCUMENTS 202038 7/1939 Switzerland .......... 137/549

Primary Examiner—George L. Walton
Attorney, Agent, or Firm—Lyon & Lyon

[57] ABSTRACT

A liquid control assembly for controlling the flow of a liquid into a reservoir. A float means for shutting off the flow of liquid when the reservoir is full is provided. Also, a means for independently shutting off the flow of liquid is provided so that an easily accessible filter may be removed and cleaned.

12 Claims, 9 Drawing Figures

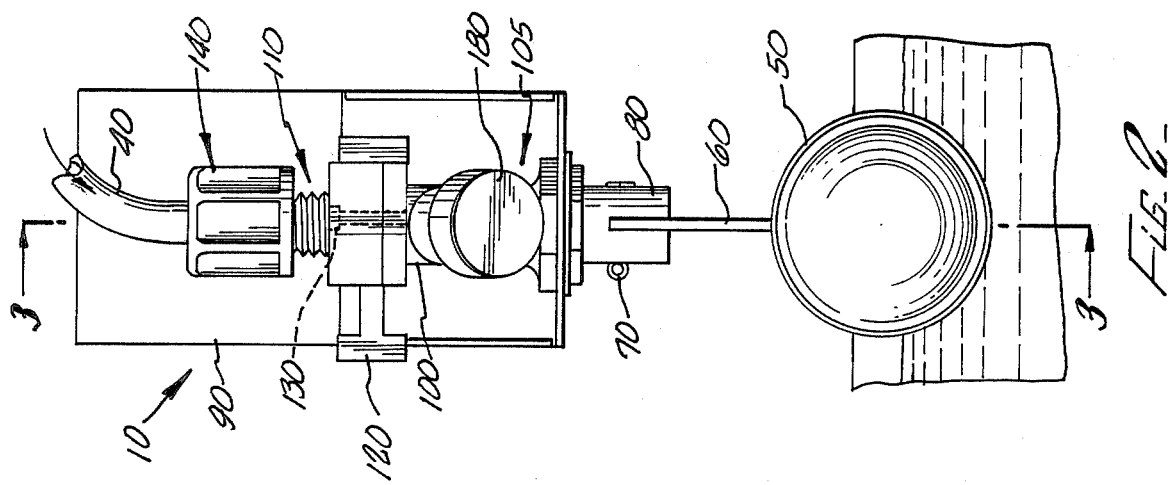
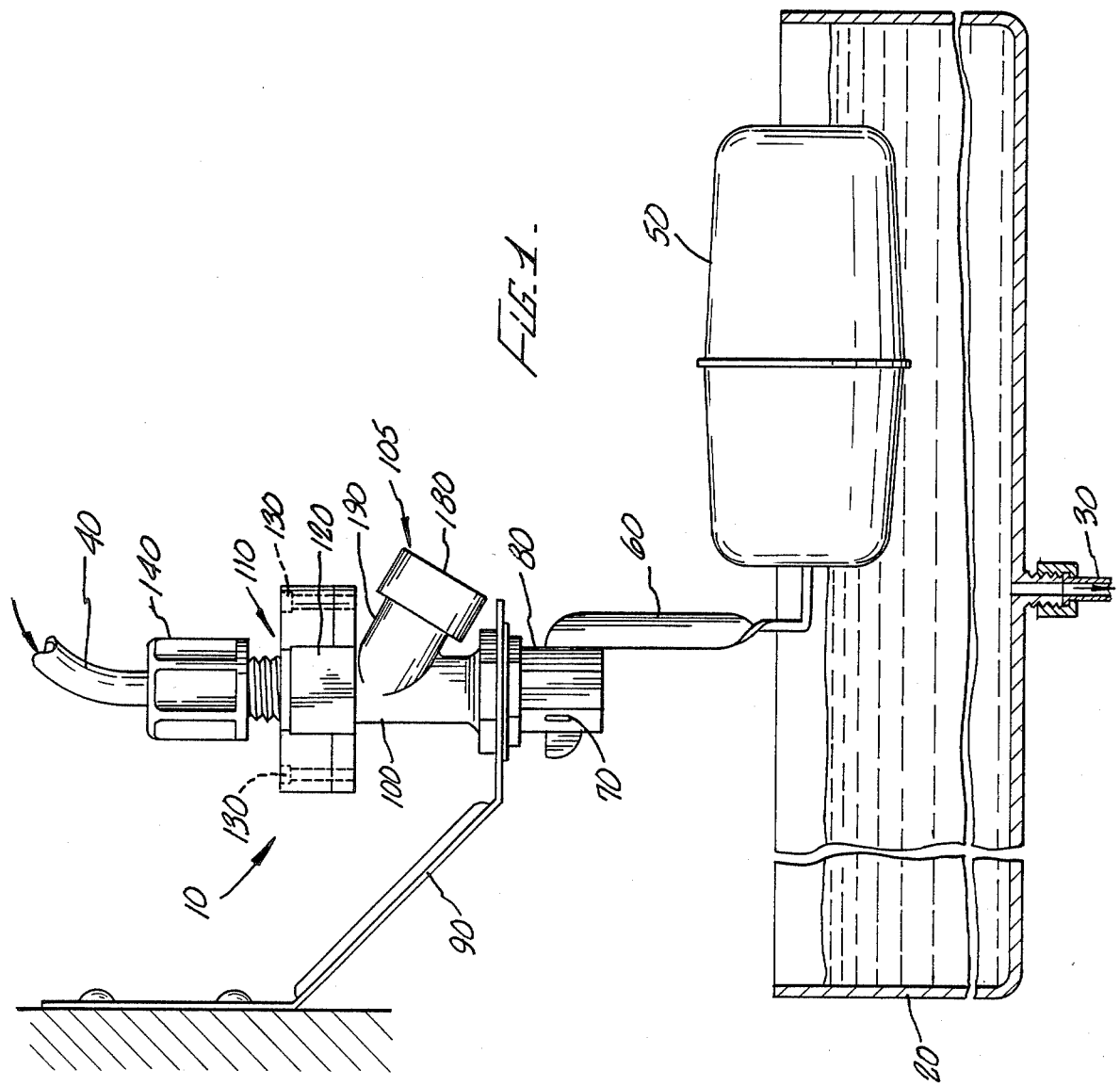

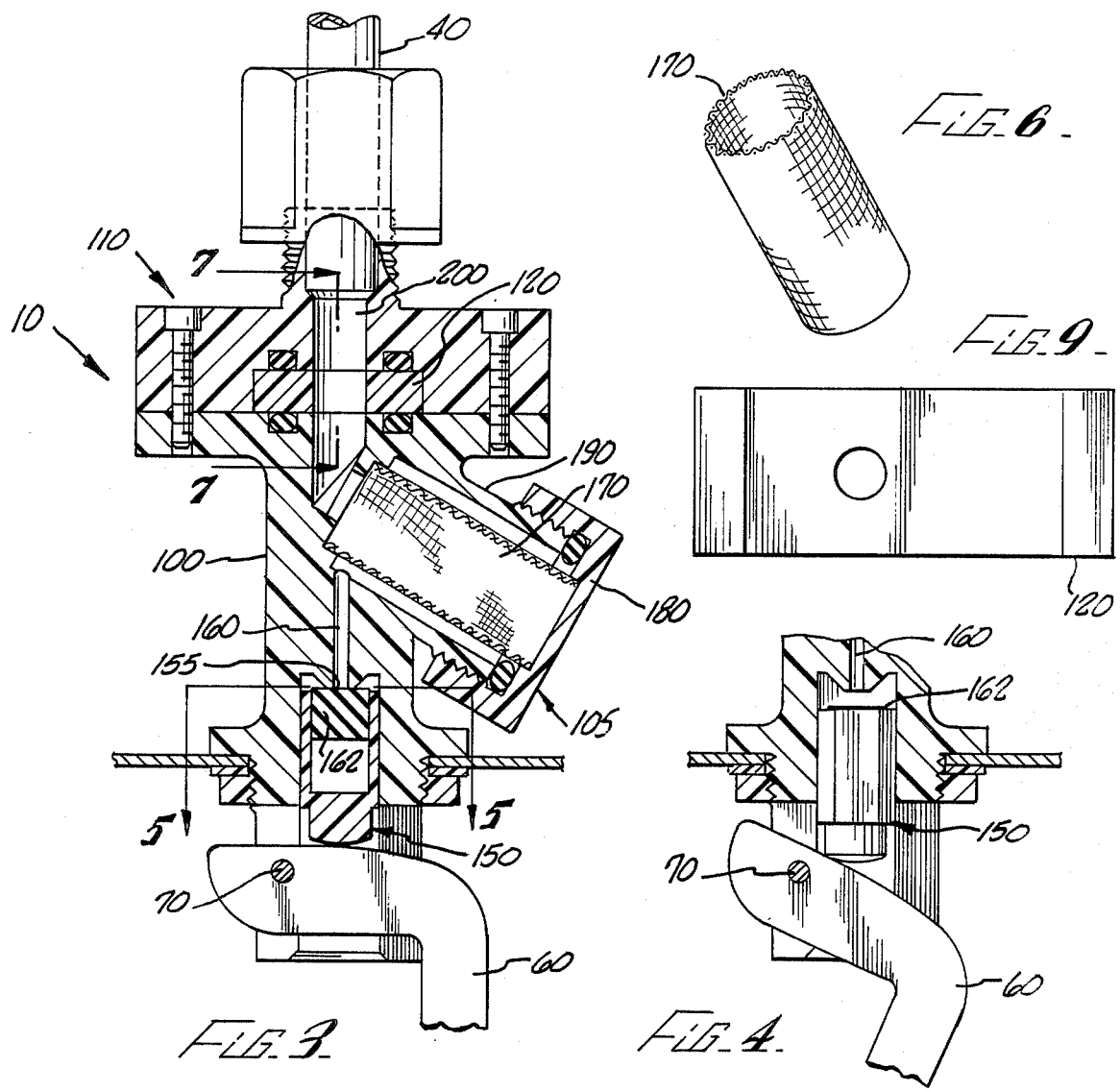
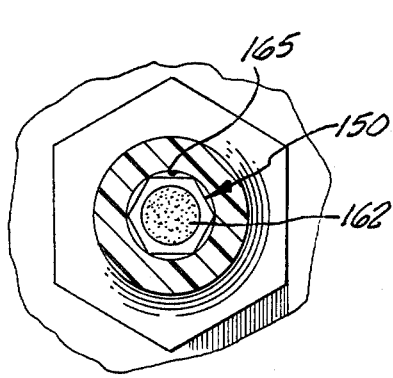
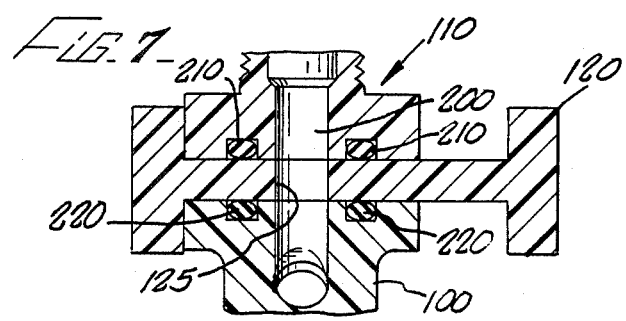
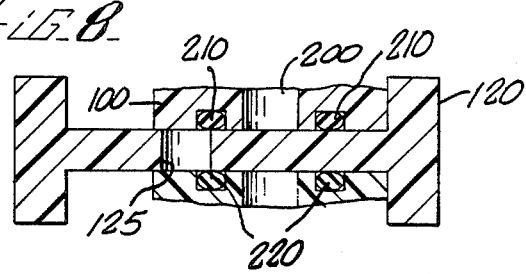

LIQUID CONTROL ASSEMBLY

BACKGROUND OF THE INVENTION

The field of the present invention is liquid control systems.

Various means for controlling the flow of liquids into a liquid reservoir exist. One way to achieve such control is to place a float in the liquid reservoir and, when the reservoir is filled to capacity, the float will shut off a valve which otherwise allows the liquid to pass through the valve into the reservoir.

It is often essential that the liquid which passes through the valve be free of particles and other contaminants before it enters the reservoir. Otherwise, the particles might clog the valve, impede the flow of liquid from the reservoir, contaminate or damage a device which receives the liquid from the reservoir or otherwise create harmful results. In some prior applications, the contamination of the reservoir is avoided by forcing the liquid to flow through a valve assembly before entering the reservoir. Any particles or foreign matter are retained by the valve assembly. However, in these prior applications the foreign matter must be removed by turning off the source of the liquid and removing the valve assembly for cleaning.

Turning off the source of the liquid is often very inconvenient. For example, the turn-off valve may be inaccessible, or the liquid source may provide liquid for multiple functions thus requiring the liquid source to be turned off for all functions when the inlet valve assembly is cleaned.

Removing the valve assembly for cleaning is also often inconvenient. In some applications, the valve assembly is difficult to remove because it is not easily accessible. Furthermore, the parts of the valve assembly can be lost or broken upon removal and cleaning. Moreover, certain parts of the valve assembly are difficult to clean even after disassembly, especially the small passages that are usually found in such valves.

SUMMARY OF THE INVENTION

The present invention relates to a liquid control system from which particles or other foreign matter introduced into the system can be easily removed without turning off the source of the liquid and without removing the valve assembly. The present invention accomplishes this result by providing a means for independently shutting off the flow of the liquid into the inlet valve assembly and a means for separating particulate matter from the liquid, which means can easily be cleaned.

A particularly beneficial employment of the present invention is in conjunction with an ice-making machine. Ice-making machines are usually found in environments where there is little space and, therefore, the valve assembly is not readily accessible for cleaning. Moreover, the water from which the ice is made must be free of particulate or other foreign matter which might contaminate the ice, interfere with machine functions and require frequent and expensive cleaning of the machine. Therefore, in addition to providing the other advantages explained above, the present invention provides solutions to the just mentioned problems when used with an ice-making machine.

Accordingly, it is an advantage of the present invention to provide a liquid control system which cleans the liquid of particles and other foreign matter and which can easily and conveniently be cleaned of such foreign matter. Other and further advantages will appear hereinafter.

BRIEF DESCRIPTION OF THE DRAWINGS

FIG. 1 is a side view of a liquid control assembly embodying the present invention.

FIG. 2 is a front view of the liquid control assembly of FIG. 1.

FIG. 3 is a sectional side view of a portion of the liquid control assembly of FIG. 1.

FIG. 4 is a sectional side view of the lower portion of FIG. 3.

FIG. 5 is a sectional view of the valve body and valve closer taken along line 5—5 of FIG. 3.

FIG. 6 is a perspective view of the filter illustrated in FIG. 3.

FIG. 7 is a sectional front view of the shut-off slide valve in a deactivated state and the surrounding portion of the valve assembly taken along line 7—7 of FIG. 3.

FIG. 8 is a sectional view of the shut-off slide valve of FIG. 7 in an activated state and the surrounding portion of the valve assembly.

FIG. 9 is a top view of the shut-off slide valve of FIG. 7.

DETAILED DESCRIPTION OF THE PREFERRED EMBODIMENT

Turning in detail to the drawings, FIGS. 1 and 2 illustrate a liquid control assembly 10 used in conjunction with a reservoir 20, a reservoir outlet 30 and an inlet hose 40. The liquid control assembly 10 includes a float 50, a valve lever 60, a cotter pin 70, a bracket holder cap 80, a mounting bracket 90, a valve body 100, a filter assembly 105, a valve inlet housing 110, a shut-off slide valve 120, self-tapping screws 130 and an inlet cap 140. The valve body 100 and the valve inlet housing 110 comprise a valve body assembly.

In one preferred embodiment the liquid control assembly 10 is used in an ice-maker in which the assembly 10 controls the flow of water from a water source (not shown) to an ice-making machine (not shown). The valve lever 60 is made of stainless steel for strength and corrosion resistance. The cotter pin 70, mounting bracket 90 and self-tapping screws 130 are made of suitable metals. The rest of the liquid control assembly 10 is made of natural polypropylene in compliance with FDA standards. The valve body 100 is constructed of glass-filled polypropylene for strength or any other suitable materials.

As illustrated in FIGS. 1 and 2, when the reservoir 20 is full of water, the position of the float 50 on the surface of the water forces the valve lever 60 to an up position. Referring now to FIG. 3, when the valve lever is in an up position, it pushes against the bottom of the valve closer 150, forcing the top of the valve closer 150 against the outlet opening 155 of the lower valve passage 160. The valve closer 150 seals the outlet opening 155 by means of a rubber inset 162 in the valve closer 150. This action seals the outlet opening 155 and prevents any water from passing through the liquid control assembly 10 to the reservoir 20.

On the other hand, as illustrated in FIG. 4, when the reservoir 20 is not full of water, the float 50 moves lower on the water surface, causing the valve lever 60 to rotate at the cotter pin 70 so as to allow the valve closer 150 to move away from the outlet opening 155 of the lower valve passage 160. This action permits water to pass through the liquid control assembly 10 into the reservoir 20. As is illustrated in FIG. 5, the water flows between the valve body inner wall 165 and the valve closer 150. The float 50, valve lever 60, cotter pin 70, valve closer 150 and outlet opening 155 comprise a first valve or shut-off means.

FIG. 3 illustrates the filter 170, the detachable filter cap 180 and the filter housing 190 and these elements comprise a particulate separating means or filter assembly. The filter 170 is pictured more clearly in FIG. 6. The filter preferably is in the form of a stainless steel mesh cylinder; however, it can also be made of other suitable material. The filter 170 is embedded inside the filter housing 190 which extends downwardly from the valve body 100 at an incline of approximately 60° from the downward vertical axis of the valve body 100. After the filter housing fills with water, the water pressure from the water source (not shown) forces the water through the lower valve passage 160.

As shown by FIG. 3, the flow of water through the inlet hose 40 into the upper valve passage 200 must pass through the filter 70 before it reaches the lower valve passage 160. Therefore, any particles or foreign matter in the water will accumulate inside the filter assembly 105 and not clog the lower valve passage 160 or pass into the reservoir and clog the reservoir outlet 30. Furthermore, because of the inclined orientation of the filter housing and the somewhat circuitous route which the liquid flows from the upper valve passage 200 through the filter 70 and into the lower valve passage 160, the particles and other foreign matter gravitate to a lower end of the filter and do not clog the main flow path of the liquid through the liquid control assembly 10.

As is illustrated in FIG. 3, the diameter of the lower valve passage 160 is significantly smaller than the diameter of the upper valve passage 200. The smaller diameter of the lower valve passage 160 controls the rate of flow of the liquid into the reservoir 20. The larger diameter of the upper valve passage 200 tends to create a constant flow of liquid through the lower valve passage 160.

FIGS. 7 and 8 further depict the shut-off slide valve 120 which prevents the source water from entering the valve main body 100 when the valve 120 is in a closed position. FIG. 7 shows the valve 120 in the open position. FIG. 8 shows the slide valve 120 in the closed position. FIG. 9 illustrates a top view of the shut-off valve 120, showing the configuration of the shut-off slide valve opening 125. When cleaning of the filter assembly 105 becomes necessary, the shut-off valve 120 can be slid into the closed position, making it unnecessary to turn off the water source. The detachable filter cap 180 can then be unscrewed so as to make the filter 170 accessible. The filter 170 can next be cleaned and easily put back in place. Finally, the cap 180 can be screwed on and the shut-off slide valve 120 placed into an open position, making the liquid control assembly 10 functional again. Slide valve seals 210 and 220 seal the upper valve passage 200 within the valve inlet housing 110 and the valve body 100 respectively from the outside of the liquid control assembly 10. As can be seen from FIGS. 7 and 8, the seals 210 and 220 are functional whether the shut-off slide valve is in an open or closed position.

While embodiments and applications of the invention have been shown and described, it would be apparent to those skilled in the art that certain modifications are possible without departing from the inventive concepts herein. The invention, therefore, is not to be restricted except in the spirit of the appended claims.

What is claimed is:

1. A liquid control assembly adapted to remove particulate matter from a liquid which flows from a liquid source into a reservoir, comprising, a valve body assembly having a passage means through which liquid flows from the liquid source into the reservoir, a first valve means disposed within said body assembly in association with said passage means and adapted to regulate the flow of the liquid from the body assembly into the reservoir, a second valve means disposed within said body assembly in association with said passage means upstream of said first valve means and adapted to independently prevent flow of the liquid through said passage means from the liquid source, particulate separating means disposed at a particular angular orientation between said first and second valve means through which the liquid in said passage means flows and adapted to separate and collect particulate matter from the liquid flowing from the liquid source directly to the bottom of the separating means which will then allow only particulate free liquid to said second valve during the liquid flow from the source, and means for removing said particulate separating means from said valve assembly for cleaning said collected particulate matter from said separating means without removing either of said valve means from said body assembly and without shutting off said liquid source during such removal.

2. The liquid control assembly of claim 1 wherein said particulate separating means includes a circuitous flow passage therein and a filter means within said flow passage, said flow passage having a downwardly extending portion and an upwardly extending portion downstream of said downwardly extending portion with said filter means disposed between an inlet end of said downwardly extending portion and an outlet end of said upwardly extending portion.

3. The liquid control assembly of claim 1 wherein a means for actuating said first valve means dependent on the level of liquid within the reservoir is provided.

4. A liquid control assembly for controlling a flow of liquid from a liquid source into a reservoir, comprising, a body valve assembly, a passage means within said valve body assembly for allowing the liquid to pass through said valve body assembly into the reservoir, a first shut-off means for preventing the liquid from passing through said valve body assembly into the reservoir when the reservoir is full of the liquid, a second shut-off means for selectively preventing the liquid from passing from the liquid source through said valve body assembly, and, a filter assembly disposed within said valve body at a particular angular orientation and associated with said passage means between said first and second shut-off means, said filter assembly including a filter assembly housing, a filter within said filter assembly housing, said filter assembly being adapted to separate and collect particulate matter from the liquid flowing from the liquid source directly to the bottom of the filter assembly which will then allow only particulate free liquid to said second shut-off means during the liquid flow from the source and detachable means for convenient removal of said filter assembly without removing either of said shut-off means from said valve body assembly and any other elements of the liquid control assembly for cleaning said filter assembly of the particulate matter and without shutting off said liquid source during such removal.

5. The liquid control assembly of claim 4, wherein said first shut-off means is a float assembly, comprising a valve closer, a valve lever, a lever rotating means, and a float.

6. The liquid control assembly of claim 4 wherein said filter of said filter assembly is a stainless steel mesh cylinder.

7. The liquid control assembly of claim 4 wherein said detachable means of said filter assembly is a threaded cap.

8. The liquid control assembly of claim 4 wherein said second shut-off means is slidably activated.

9. The liquid control assembly of claim 4 wherein said passage means within said valve body assembly includes an upper passage means for receiving the liquid from the liquid source into said valve body assembly, and a lower passage means for controlling the flow of the liquid into the reservoir, said lower passage means having a smaller diameter than said upper passage means.

10. The liquid control assembly of claim 4 wherein said filter assembly housing of said filter assembly extends downwardly from said valve body at less than a ninety degree angle from the downward vertical axis of said valve body.

11. A liquid control assembly for controlling a flow of liquid from a liquid source into a reservoir for an ice-making machine, comprising,
a valve body, including an upper valve body portion and a lower valve body portion,
a passage means within said valve body, including an upper passage means for receiving the liquid from the liquid source into said valve body, and a lower passage means for controlling the flow of the liquid into the reservoir, said lower passage means having a smaller diameter than said upper passage means,
a float assembly for preventing the liquid from passing through said valve body when the reservoir is full of the liquid, comprising,
a float which floats on the surface of the liquid reservoir,
a valve closer for closing said lower passage means,
a valve lever for causing said valve closer to close said lower passage means when the liquid reaches a predetermined level in the reservoir, and
a lever rotating means,
a shut-off means for selectively preventing the liquid from passing from the liquid source through said valve body, said shut-off means being slideably activated,
a filter assembly within said valve body associated with said passage means between said float-assembly and said shut-off means, including,
a filter housing which extends downwardly from said passage means of said valve body at less than a ninety degree angle from the downstream directional axis of said passage means,
a filter within said filter housing, said filter being adapted to separate and collect particulate matter from the liquid flowing from the liquid source directly to the bottom of the filter which will then allow only particulate free liquid to said shut-off means during the liquid flow from the source and
detachable means for convenient removal of said filter without removing said float assembly and said shut-off means from said valve body and any other elements of the liquid control assembly for cleaning said filter of the particulate matter and without shutting off said liquid source during such removal.

12. The liquid control assembly of claim 11 further comprising seal elements for sealing said upper passage means.

* * * * *